United States Patent [19]

Reikowski et al.

[11] Patent Number: 4,569,713

[45] Date of Patent: Feb. 11, 1986

[54] APPARATUS FOR MAKING FIBER REINFORCED ARMATURES

[75] Inventors: Harold J. Reikowski, Southfield, Mich.; James L. Hetherwick, Sylvania, Ohio

[73] Assignee: Kelsey-Hayes Company, Romulus, Mich.

[21] Appl. No.: 614,497

[22] Filed: May 29, 1984

[51] Int. Cl.⁴ .......................... B29C 1/00; B29D 3/02
[52] U.S. Cl. ...................... 156/433; 74/552; 156/446; 249/56; 249/57; 249/83; 425/521
[58] Field of Search ............ 425/519, 521, 192 R; 249/117, 122, 124, 125, 88, 56, 57, 83; 74/552; 156/169, 172, 175, 500, 443, 446, 433

[56] References Cited

U.S. PATENT DOCUMENTS

4,419,908 12/1983 Reikowski ........................... 74/552

Primary Examiner—Willard E. Hoag
Attorney, Agent, or Firm—Ralph J. Skinkiss; William P. Hickey

[57] ABSTRACT

A mold for making steering wheels by winding resin impregnated fibers. The mold includes a hub support pedestal to support a hub about which fibers are wound, means having a rim forming recess, a plurality of ramps connecting said means having said rim forming recess to said pedestal and means for pressing said fibers against said ramps.

18 Claims, 13 Drawing Figures

APPARATUS FOR MAKING FIBER REINFORCED ARMATURES

TECHNICAL FIELD

The present invention relates to apparatus for producing fiber reinforced armatures comprising a rim, hub, and interconnecting spokes; and more particularly to fiber reinforced armatures for the steering wheels of automotive vehicles.

BACKGROUND OF THE INVENTION

Prior art apparatus for producing filament wound steering wheels comprises a mold having a base with a partial rim forming groove around its periphery. A pedestal for supporting a hub is fixed centrally of the rim forming groove, and a ramp with a spoke forming depression proceeds radially from the rim forming groove to the pedestal. A metal hub is fixed to a pin on the pedestal, and the spoke forming depression intersects this hub. Rim cover segments are fastened to the base using threaded fasteners to enclose the rim forming groove, except for an access space which communicates with the periphery and through which resin and strand are pulled into the rim forming cavity.

Before the winding operation proceeds, the parts of the mold are cleaned and coated with a resin release agent, and the various parts of the mold are bolted together. A robot finger carrying a guide eye, guides resin coated strand under tension over the rim access groove. The mold is turned to pull the "wetted" strand into the groove for a certain number of wraps, rotation of the mold is stopped, the finger moves up the ramp to the hub and around the hub, (sometimes in one direction and sometimes in the other direction), and then down the ramp to the rim. In this manner resin and fibers are built up around the hub, and the rim, and spokes are produced therebetween. A hoop is then tightened down into the rim forming groove to compress the material therein and provide a dense and compacted rim.

After the mold has been filament wound, it is moved to an oven to cure, and then the various pieces of the mold are removed one by one by unthreading the fasteners. Finally the hardened armature remains adhered to the base of the mold, and it is then pried loose and deflashed.

One of the problems that has occurred is that the prior art process of filament winding can not produce a spoke having a reverse curvature.

Still another problem that has occurred is that the assembly and disassembly of the parts of the mold is quite cumbersome and time consuming.

Accordingly, an object of the present invention is the provision of a new and improved apparatus for producing armatures having fiber reinforced spokes that have a reverse curvature.

Another object of the present invention is the provision of a new and improved mold which automatically removes the molded part from the base of the mold during the initial stage of mold disassembly.

A further object of the present invention is the provision of new and improved fastening means for molds which permits all parts to be locked and unlocked by a simple axial pressing movement.

Further objects and advantages of the present invention will become apparent to those skilled in the art to which it relates from the following description of several preferred embodiments taken with the attached drawings forming part of this specification.

DESCRIPTION OF THE PREFERRED EMBODIMENTS

While the invention is not so limited, it is herein shown as embodied in a method and apparatus for making an automotive steering wheel. In the embodiment first described, the hub is moved laterally from its position during winding, but the invention is not limited to this lateral movement.

Prior art steering wheels with which we are familar have the spokes joined to the hub generally radially of the midsection of the hub, with some of the filaments passing one way around the hub, and some of the filaments passing the other way around the hub. In the embodiments about to be described, the filaments which form a spoke enter the fiber receiving groove of the hub tangentially, pass around the back side of the hub, around the front, and along the back side again, before passing down another one of the spokes. This winding procedure is important to the present invention.

In the preferred embodiment shown in FIGS. 1 through 11, there are two spokes each attached tangentially to a respective end of an oblong hub. The armatures are wound with the steering wheel inverted so that the hub is positioned above the plane of the rim. While some principles of the present invention are not limited to armatures having spokes which proceed concave downwardly from the hub to the rim, others relate principally thereto; and in the most preferred shape capable of being made by the present invention, the spokes will have a reverse curvature.

Figures 1, 13:
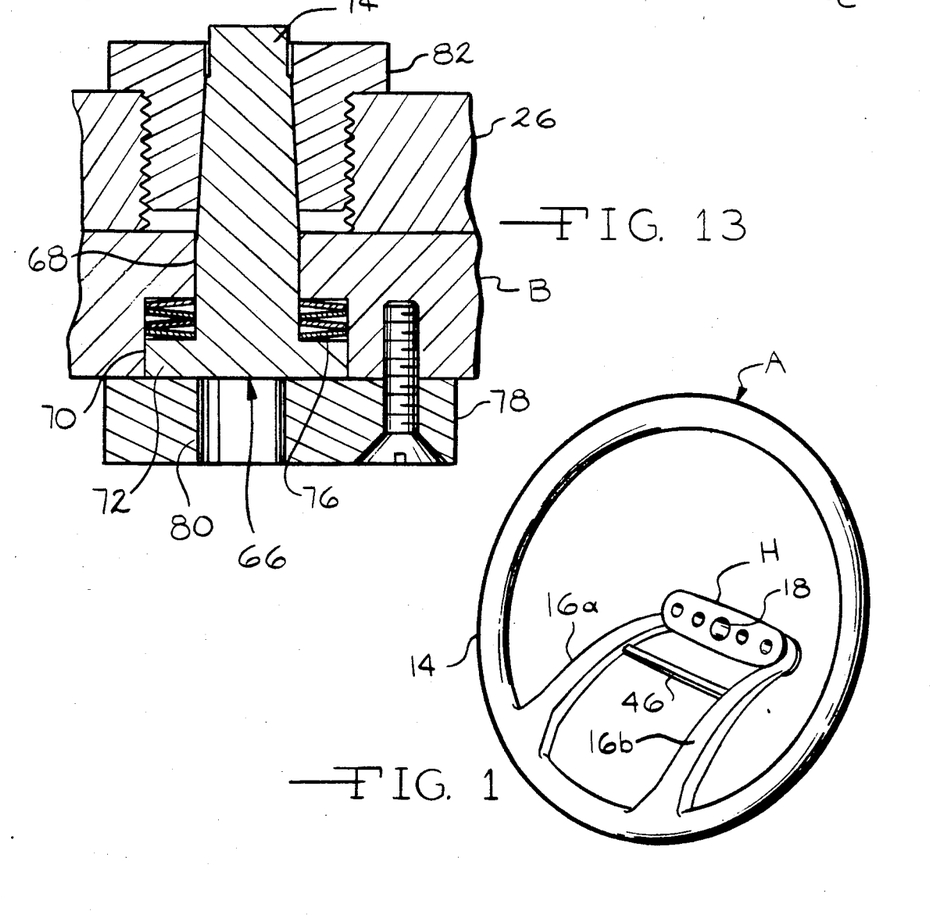
FIG. 1 is an oblique view of a filament wound steering wheel made according to principles of the present invention.
FIG. 13 is a fragmentary sectional view taken approximately on the line 13—13 of FIG. 10.
Figure 5:
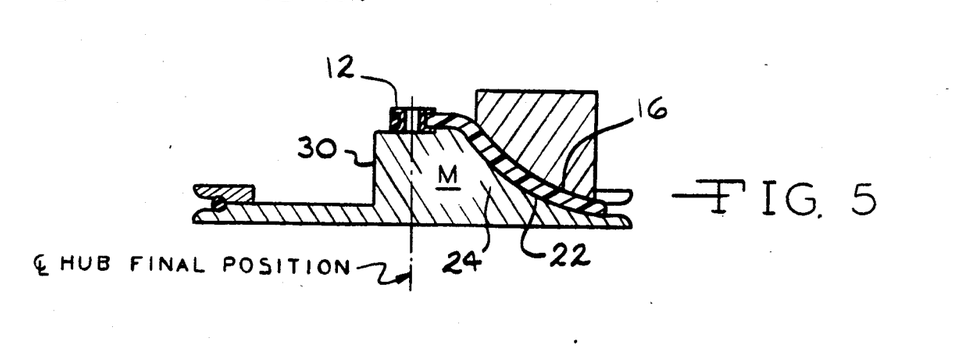
FIG. 5 is a schmetic view similar to that of FIG. 4 but showing the filaments pressed down onto the spoke forming cavity of the mold.
Figure 11:
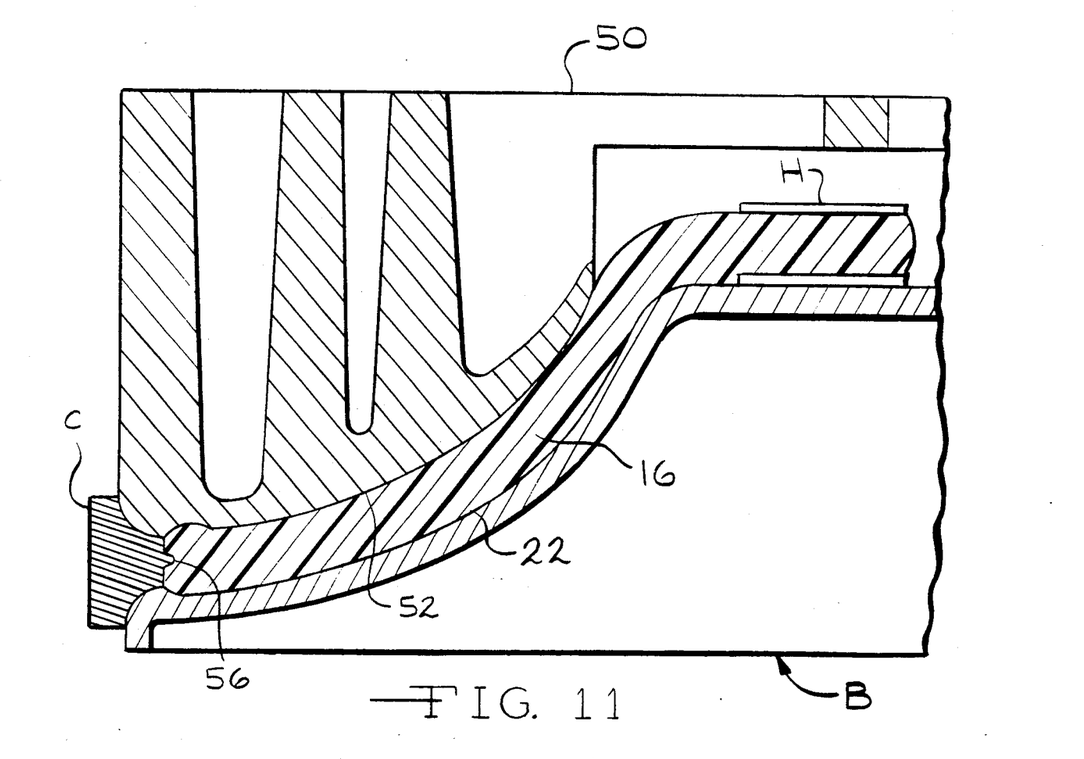
FIG. 11 is a sectional view taken approximately on the line 11—11 of FIG. 9 and showing a spoke in its finished, compressed, condition.
Figure 12:
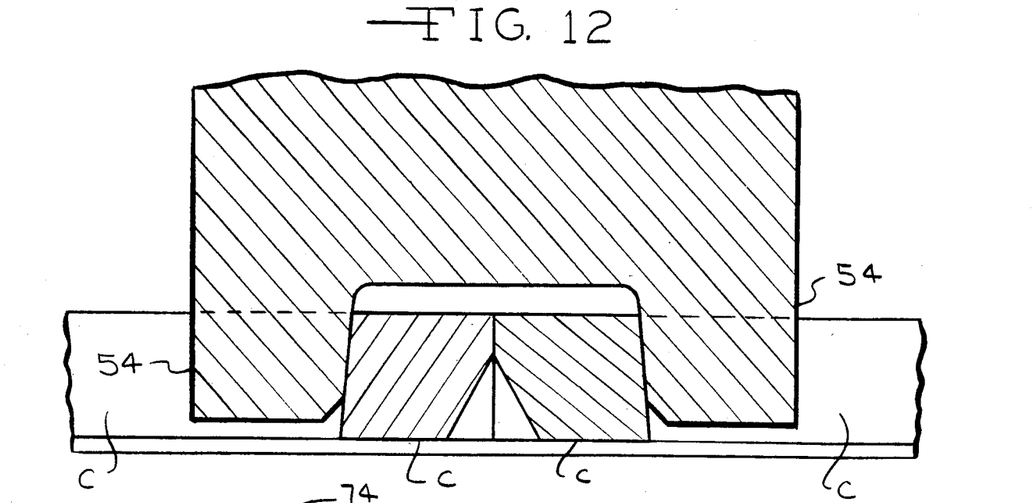
FIG. 12 is a fragmentary sectional view taken approximately on the line 12—12 of FIG. 10.

FIG. 1 of the drawings shows an armature A for a steering wheel of an automotive vehicle and comprises an oblong metal hub H having a fiber receiving groove 12 therein (see FIG. 6), a circular rim 14, and two interconnecting spokes 16a and 16b. The hub has a mounting hole 18 through its center and the rim 14 is generally concentric thereto. As best seen in FIGS. 5 and 11, spokes 16 proceed laterally outward from the hub, to a midsection that is curved downwardly towards the plane of the rim, to an outer section having a reverse curvature which enters the rim laterally. The armature A of FIG. 1 is, as stated above, made upside down by filament winding strand wetted with a polyester resin in a mold M.

Figure 2:
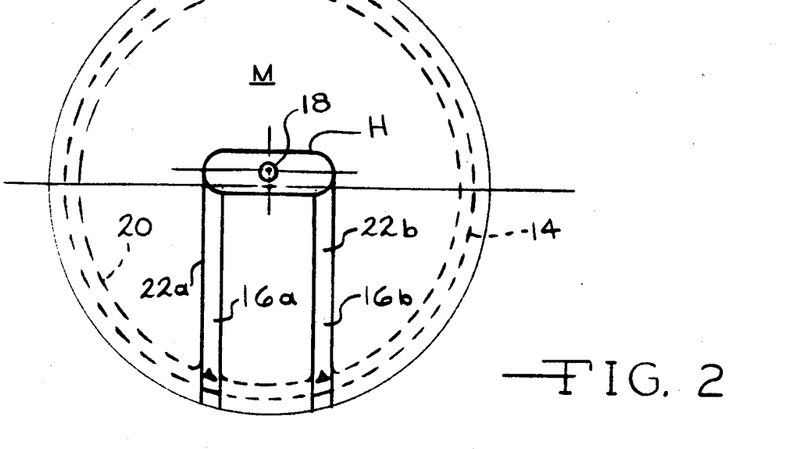
FIG. 2 is a partly schematic plan view of the steering wheel shown in FIG. 1 as confined by portions of the mold in which it is made.

FIG. 2 of the drawings schematically shows an armature as wound in a mold M having a rim forming groove 20 and two spoke forming recesses 22a and 22b located in ramps 24 which proceed from the rim forming groove 20 to the respective ends of a hub H mounted above and coaxially of the rim 14.

Figure 3:
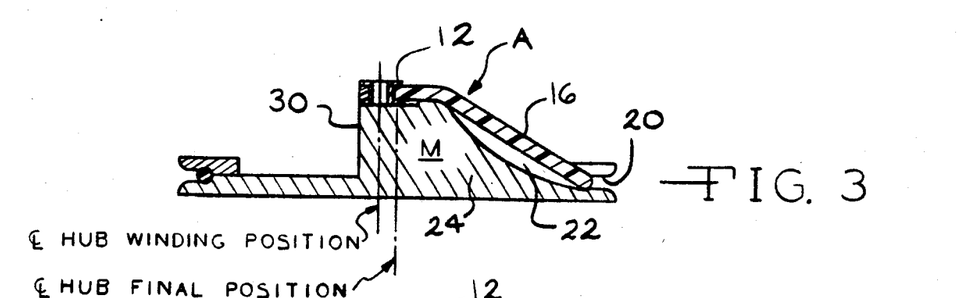
FIG. 3 is a partly schematic sectional view taken approximately on the line 3—3 of FIG. 2 but with portions of the mold omitted for the sake of clarity, and showing the position of the parts in the as wound condition.

FIG. 3 of the drawings schematically shows the mold M with an armature A therein just after the filament winding operation. During winding, as seen in FIG. 2, the hub H is clamped laterally away from its final position adjacent the spoke forming grooves 22 in the ramps 24. As wound, the filaments are essentially taunt from the rim forming groove 20 to the top of the ramp, and are taunt around the hub receiving groove 12, as above described. As will be seen in FIG. 3, the fibers forming the spokes are held taunt considerably above the concave portions of the spoke forming grooves 22.

Figure 4:
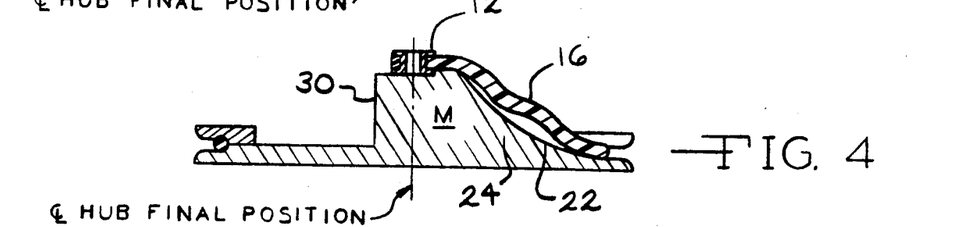
FIG. 4 is a view similar to that of FIG. 3, but showing the parts with the hub moved laterally to sag the filaments to a position adjacent the mold.

After the winding operation is completed, the hub H is moved laterally, as shown schematically in FIG. 4, to its final position adjacent the ramps 24. In the mold shown in FIGS. 2–11, the distance between the winding position of the hub shown in FIG. 3 and the final position shown in FIG. 4 is slightly less than is the increased fiber length required for the spoke forming fibers to sag all the way into contact with the concave portion of the spoke receiving grooves 22.

In the final shaping operation of the armature shown in FIG. 5, the fibers of the spokes 16a and 16b are forced downwardly and firmly into the concave portion of the spoke forming grooves 22. The necessary increase in spoke fiber length that is required for the fibers to reach their final curvature comes from pulling the fibers, that are wound around the hub, more tightly. The fibers are of course wetted out with a hardenable resin or binder before being wound in position, so that some of the resin between the hub and fibers is squeezed out by the tightening process, and the fibers are brought in more direct contact with the hub. Later in this specification other means for tightening the fibers around the hub will be described.

The details of the mold construction which permits the armature, after hardening of its binder, to be removed from the mold is shown in FIGS. 6 through 13. This is best understood by examining the parts as they are assembled first for the stage of winding, and then for the stage of compacting the wound armature.

Figure 6:
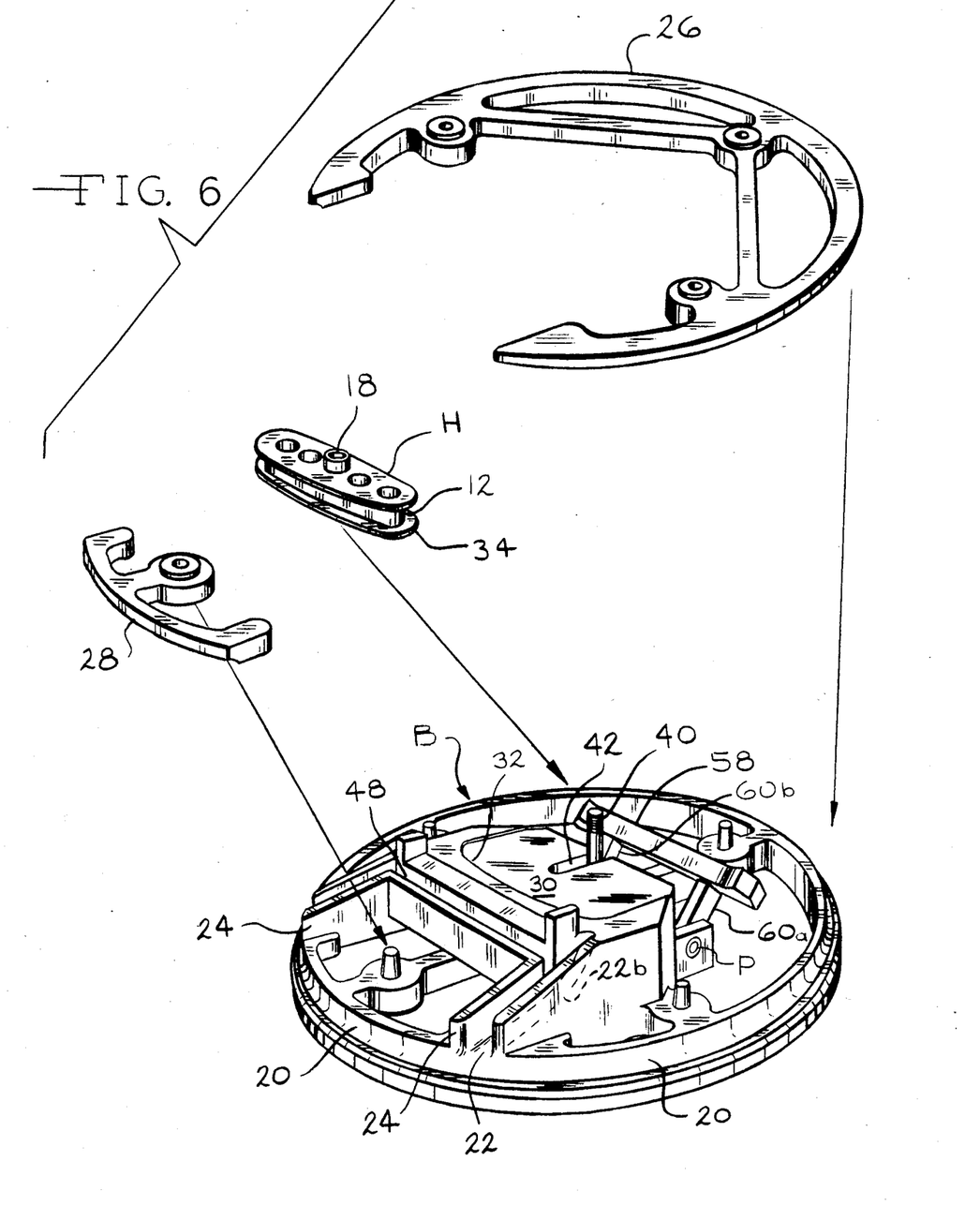
FIG. 6 is an oblique exploded view of the base of the mold along with rim cavity covers and a hub and all of which need to be assembled before winding filaments onto the mold.

FIG. 6 shows the base portion B of the mold as well as the steering wheel hub H, and cover segments 26 and 28 for defining the rim forming groove 20 in the base B. The base B has a centrally located hub pedestal 30 the top of which is recessed as at 32 to receive the bottom flange 34 of the hub. The recess 32 extends to the back edge of the pedestal so that the hub can be slid from the winding position to its final position where its flange 34 is against the front edge of the recess 32.

In order to clamp the hub H in its winding position at the back of the pedestal 30, and in its final position at the front of the pedestal 30, the pedestal is provided with a horizontal slot 36 (see FIG. 10) below its top surface for receiving the head 38 of a clamping bolt 40. A vertical slot 42 accomodates the shank of the metal hub H to lock the hub in either of its positions, and when the nut 44 is loosened, the hub can be slid from one of its positions to the other.

The armature of FIG. 1 has a horizontal brace 46 between its two spokes 16a and 16b. This is made by providing a horizontal groove 48 (see FIG. 6) in the pedestal connecting the bottom of the spoke forming grooves 22. Before the winding operation begins, a large bundle of resin soaked fibers is laid into the groove 48. The bundle is longer than is the groove 48 and half of the fibers on each end is bent toward the hub, and the other half is bent toward the rim in each spoke shaping groove 22. During filament winding, binder wetted strand is wound around the rim shaping groove 20 up one spoke shaping groove 22, around the hub H and down the other spoke shaping groove. The spoke fibers are held taut between the hub and rim well over the grooves 22, as shown in FIG. 3.

Figure 7:
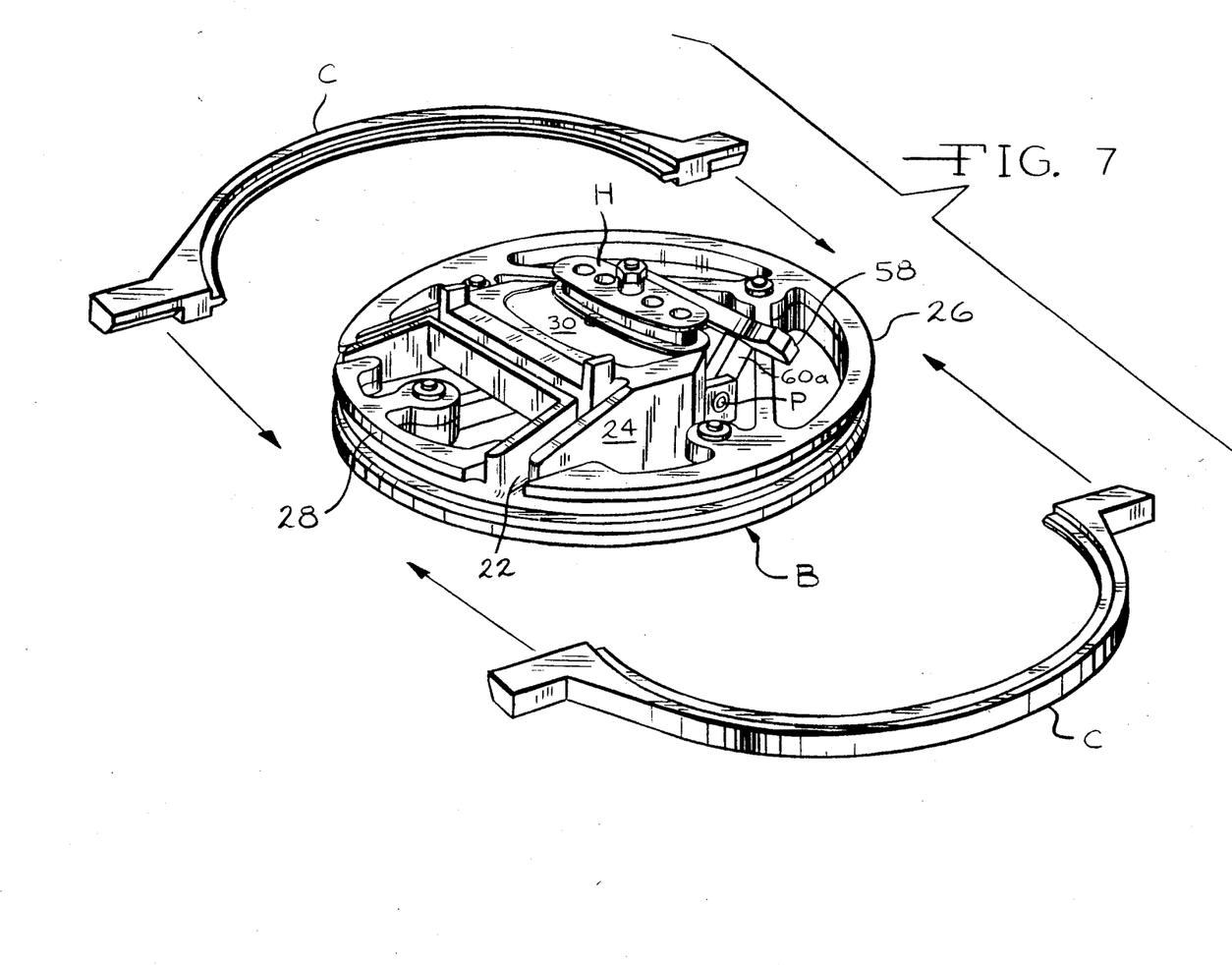
FIG. 7 is an oblique exploded view showing the parts of FIG. 6 assembled for winding, and showing the rim compression bands ready for assembly on the mold after the winding operation.

FIG. 7 of the drawings shows the mold M assembled for filament winding. The mold as shown in FIG. 7 has the hub H clamped in the winding position previously described. FIG. 7 also shows two semicircular rim compacting bands C spaced apart from the mold ready to be moved into position over the rim forming groove 20.

Figure 8:
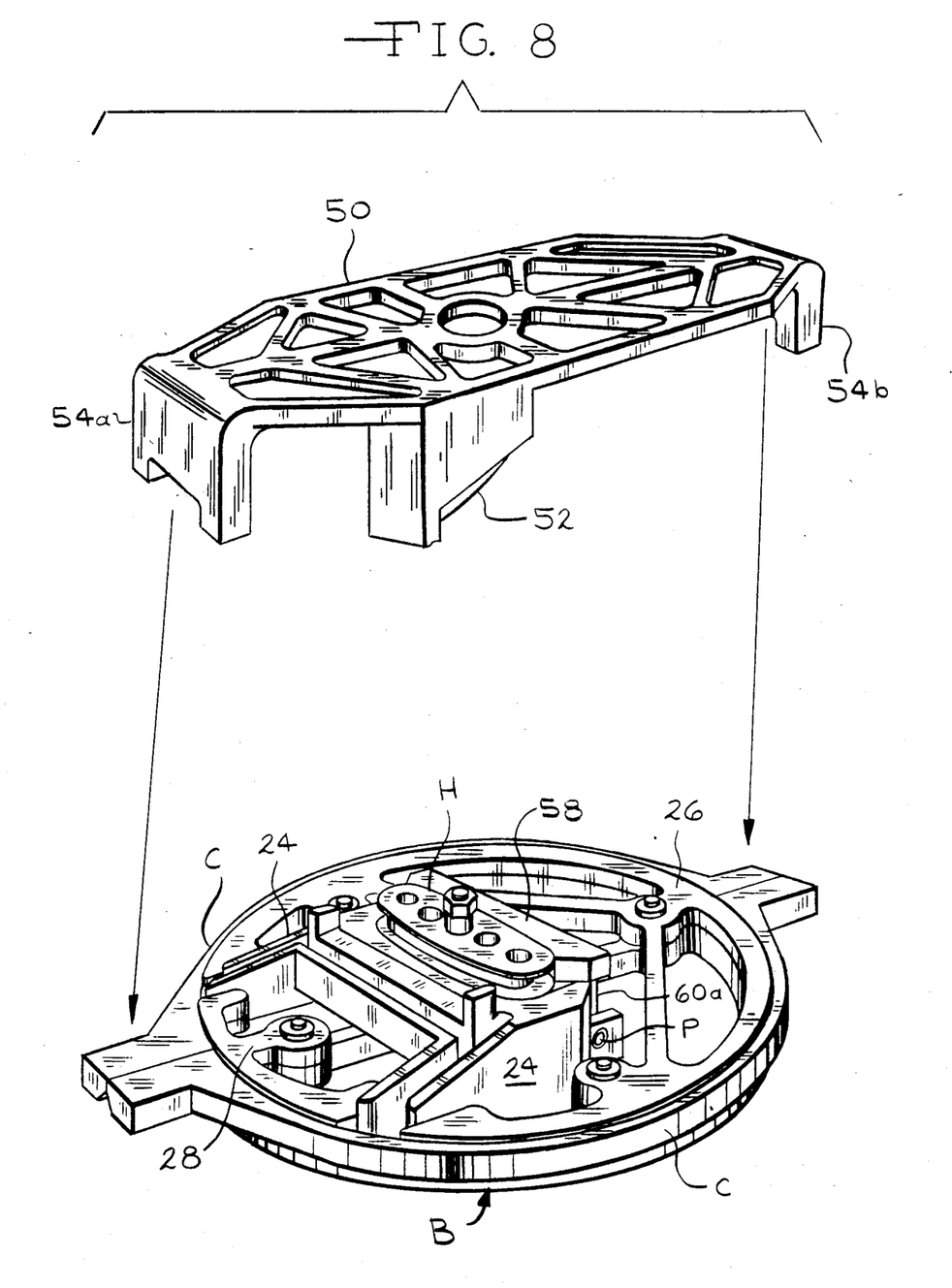
FIG. 8 is an oblique view of the parts shown in FIG. 7 assembled and with the hub translated to a position adjacent the spoke forming ramps so that the mold is ready to receive the spoke compressing cover portion of the mold.

FIG. 8 shows the hub H moved to the front adjacent the ramps 24, such as is necessary to sag the filaments of the spokes down into the spoke shaping grooves 22. FIG. 8 also shows a cover member 50 for the mold positioned above the mold ready to be lowered down onto the remainder of the mold which contains the filament windings and brace forming bundle.

According to features of the preferred embodiment shown, the cover 50 is made in the form of a bridge to perform a number of functions. The bridge 50 has two rib compressors 52 depending therefrom which fit into the rib shaping grooves 22 when the bridge is properly aligned, and depending legs 54a and 54b which are adapted to cooperate with the rim compacting bands to hold them in position around the base of the mold as will later be described in further detail.

Figure 9:
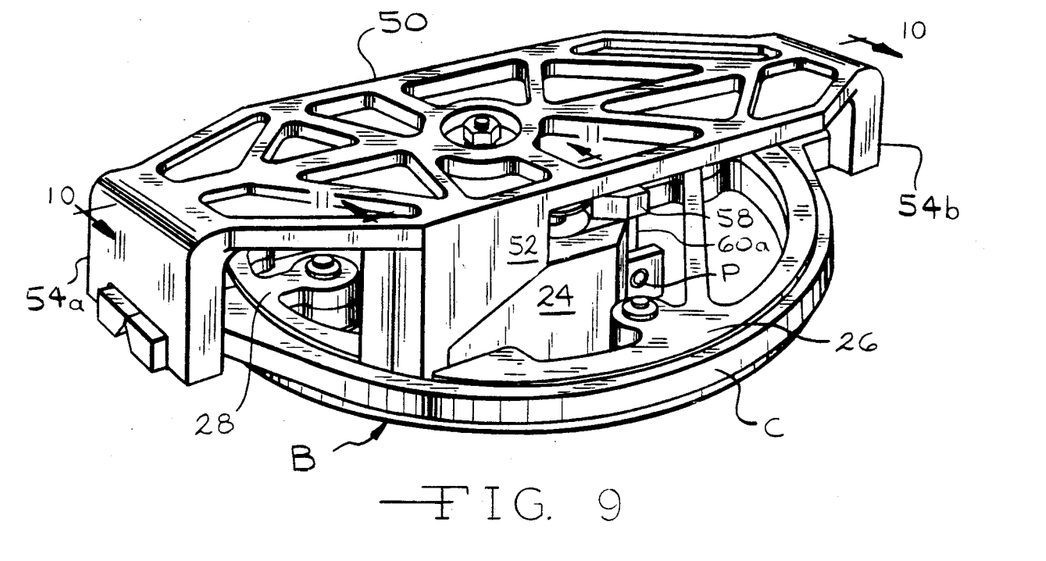
FIG. 9 is an oblique view of the completely assembled mold containing the armature therein in its binder hardened condition.

FIG. 9 shows the bridge 50 in its assembled position compressing and clamping the remainder of the mold together. FIG. 11 shows how the rib compressors 52 force the spoke forming fibers against the bottom of the spoke forming grooves 22. It also shows how the rim compacting bands C compact the material forming the rim. The bands have a lip 56 that projects into the materials which form the rim of the armature to form a groove around the periphery of the rim of the armature. The importance of this will later be explained.

While it is not necessary in all instances, the mold shown in the drawings also includes means for pressing binder and fibers against the back side of the hub to compact and smooth out the materials before cure. Referring to FIG. 6, there is seen a tiltable bar 58 adapted to abut the back of a hub when mounted on the pedestal 30. The tiltable bar 58 has depending arms 60a and 60b, the lower ends of which are pinned to the back side of the pedestal 30. FIG. 7 shows the tiltable bar 58 tilted back clear of the hub H so that fibers can be wound onto the hub H. FIG. 8 shows the tiltable bar, in engagement with the back of the hub H, and with the hub H moved to its final position ready to receive the cover bridge 50. During the lowering movement, the cover bridge 50, abuts the top of the tiltable bar 58 (best seen in FIG. 10) to rotate the tiltable bar 58 against the back side of the hub H. As previously explained, the compactors 52 tighten the fibers that are wrapped around the hub and a certain amount of binder is dislocated between the hub and the fibers. Tiltable bar 58 among other things, holds this binder in the hub groove 12 to keep it full of binder.

Figure 10:
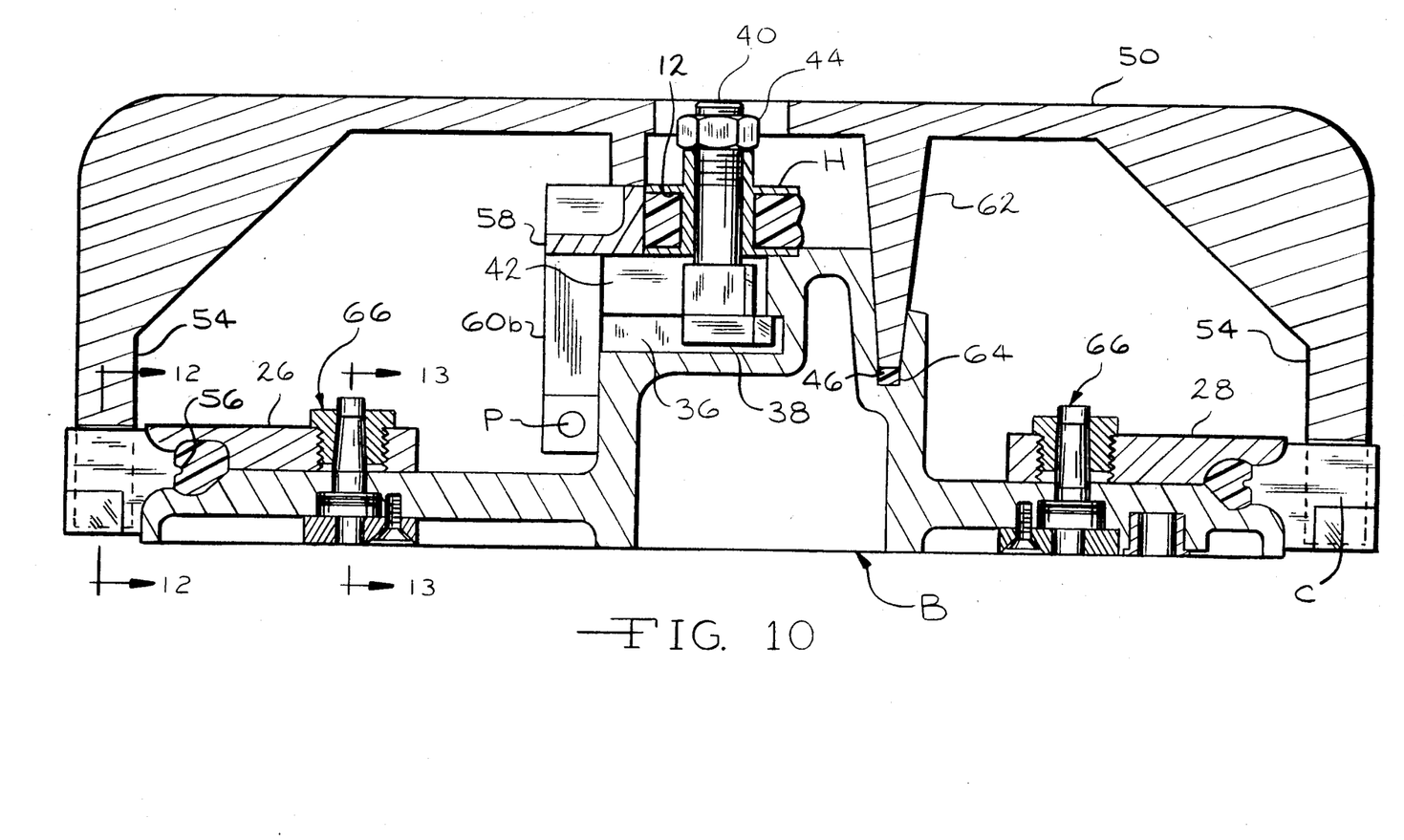
FIG. 10 is a sectional view taken approximately on the line 10—10 of FIG. 9.

Referring to FIG. 10, it will be seen that the cover bridge 50 simultaneously compacts the bundle of fibers which form the brace 46 and at the same time compacts the ramps 16 as shown in FIG. 11. The front and back sides of the brace receiving groove 64 are tapered, (see FIG. 10) so that the compactor 62 automatically centers the bridge 50 relative to the mold and causes the spoke compressors 52 to move downwardly and backwardly toward the bottom of the spoke shaping groove 22 (see FIG. 11) in a manner generally perpendicular thereto. This helps to prevent binder from being forced out of the spoke forming cavities.

In the embodiment shown in the drawings, the bridge 50 is slightly yieldable, so that the depending legs 54 can continue to be forced downwardly after the compactors 52 (see FIG. 11) and 62 have fully compacted the fibers in the spokes and brace respectively. The inner surfaces of the depending legs 54 are tapered at about five degrees (see FIG. 12) and the ends of the rim compacting bands C are correspondingly tapered; so that when the legs are forced over the ends of the bands, a friction lock is produced which locks the bridge in place onto the bands, and the bands in turn onto the remainder of the mold.

It has previously been explained that the rim covers 26 and 28 are removably attached to the base of the mold before the start of the winding operation. Any suitable means can be used for this; but in the embodiment shown in the drawings, a quick coupling and uncoupling device is provided that is actuated by a vertical pressing motion. The coupling device 66 is shown in FIGS. 10 and 13. The rim cover segment 26 utilizes one such coupling device, and the segment 28, because it is larger, utilizes three such coupling devices. Referring to FIG. 13, the base B is bored as at 68 and counterbored as at 70 from its bottom surface to receive the head 72 of a tapered pin 74. The lower shank portion of each pin 74 is cylindrical and has a sliding fit in its bore 68; and a plurality of Bellville washers 76 is provided between the head 72 and bottom of the counterbore 70. A retainer plate 78 is suitably fixed over the head 72 and is provided with a hole 80 therethrough for access to the head 72. The rim cover segments 26 and 28 have a hardened bushing 82 threaded into the cover segments in position for the bushings to receive an appropriate one of the tapered pins 74. The hole in the bushings 82 is tapered to fit the pins 74 at an angle to give a locking taper. When a pin 74 is forced into its cooperating bushing, the tapered pin centers the cover segment with respect to the base B of the mold and locks the two together. The cylindrical fit of the shank of the pin in the bore 68 prevents lateral shifting of the covers during the filament winding operation.

After the winding operation, the mold goes through a binder hardening oven for cross linking the polyester resin. The rigid armature is then removed from the mold in a unique stripping operation. First, a fixture having a plurality of punches is lowered through suitable openings in the bridge 50 to press the top ends of the tapered pins 74 downwardly to unlock the rim cover segments 26 and 28 from the remainder of the mold. Then the mold is supported by a support ring (not shown) which abuts and supports the bottom of the rim compacting bands C. The compacting bands C, as previously explained, have a lip 56 that extends into the rim of the armature. When the base B of the mold is pressed downwardly, the lip 56 pops the armature compacting bans C, the rim cover segments 26 and 28, and the bridge 50 off of the base B of the mold. Thereafter the rim compacting bands C are easily knocked off of the bridge 50, and the cover segments 26 and 28 fall off of the armature.

Now that one embodiment of the invention is fully understood, other embodiments can be described by merely pointing out differences. Those portions not described will correspond to the portions of the embodiment already described. When it is desired to utilize the principles of the invention to make armatures whose spokes are not parallel, it may not be feasible to shift the hub laterally to tighten the filaments around the hub. In this situation, the hub can be moved vertically to tighten the wraps around the hub. In other embodiments designed to make spokes that are not parallel but have spokes with a reverse curvature, the hub can be lowered to sag the filaments into their spoke confining groove. In other embodiments wherein it is desired to both tighten the filaments around the hub and make concave spokes, the hub might first be raised relative to the rim against the bottom of the spoke compactors, and the portion of the mold that supports the hub and rim then raised against the spoke compactors to compact the materials which form the spokes.

It will now be apparent that the objects heretofore enumerated, as well as others, have been accomplished; and that there has been provided a new and improved apparatus for making fiber reinforced binders into armatures in which the fibers are better tightened onto the hubs, and/or spokes having concave configurations are produced, and/or molds that are more easily disassembled and the armature removed therefrom.

While the invention has been described in considerable detail, we do not wish to be limited to the embodiments shown and/or described; and it is our intention to cover hereby all novel adaptations, modifications and arrangements thereof which fall within the practice of those skilled in the art to which the invention relates and which come within the purview of the following claims.

We claim:

1. In a mold for producing a fiber reinforced armature having a rim, a hub having a fiber receiving groove and a plurality of interconnecting spokes, with the hub being above the plane of the rim, and the spokes extending downwardly therefrom to the rim: a rim forming recess communicating with the periphery of the mold; a hub supporting pedestal generally centrally located with respect to the rim forming recess, a plurality of ramps which extend from said rim forming recess to said pedestal, said ramps each having a spoke forming recess that is concave, said spoke forming recesses being arranged to communicate tangentially with the fiber receiving groove of a hub positioned on said pedestal; movable hub securing means for securing a hub in a wrapping position spaced from said ramps, and again in a final position adjacent said ramps with the distance between said position being sufficient to allow the fibers to sag concavely into the spoke forming recesses when a hub having fiber wound taut in the wrapping position is moved to the final position.

2. The mold of claim 1 wherein: said wrapping position of said hub is spaced from said final position by a distance insufficient to sag the spoke forming fibers completely into contact with the spoke forming recesses; and wherein said mold includes compaction means for forcing the spoke forming fibers down against the spoke forming recesses to pull fibers from around the hub and tighten fibers wrapped around the hub.

3. In a mold for producing a fiber reinforced armature having a rim, hub and at least one interconnecting spoke: a base; at least one removable cover segment overlying said base, said base and cover segment forming a rim cavity which communicates with their radially outer periphery; hub securing means for holding a hub generally centrally of said base; a ramp extending from said rim cavity to said hub securing means and having an upwardly facing spoke forming cavity therein; a ramp cover member for said spoke forming cavity adapted to compact material in said spoke forming cavity, said ramp cover member and hub securing means having winding positions which provide a predetermined taut length of filament between a hub on said hub securing member and said rim cavity; and one of said members being movable to increase said filament length distance between the hub and rim cavity to tighten filaments wrapped around a hub positioned on said hub securing means.

4. The mold of claim 3 wherein: said hub securing means is movable to a position remote from said ramp to tighten the fibers on said hub.

5. The mold of claim 3 wherein: said spoke forming cavity is concave, and said hub securing means is movable to a winding position remote from said ramp wherein the wound fibers are taut above said spoke forming cavity, and said hub securing means has a final position adjacent said ramp wherein the fibers sag generally into conformance with said spoke forming cavity.

6. The mold of claim 3 wherein: said spoke forming cavity is concave so that fibers that are wrapped taut between the hub and rim over said ramp are above and out of contact with the concave portion of the spoke forming cavity, and wherein said ramp cover is movable to compact the fibers into said spoke forming cavity, and whereby fibers are tightened around said hub when the ramp cover presses the fibers into the concavity of the spoke forming cavity.

7. The mold of claim 3 wherein: both said hub securing means and said ramp cover are movable and said spoke forming cavity is concave, said hub securing means being movable from a winding position remote from said ramp to a final position adjacent said ramp with the distance between said positions being such that fibers stretched from the winding position to the rim are considerably above said concave spoke forming cavity, and the final position is such that the fibers become sagged but are still out of complete contact with said spoke forming cavity, said ramp cover being movable to force the fibers from the sagged condition down into complete contact with the spoke forming cavity to draw fibers from around the hub.

8. The mold of claim 7 wherein: said hub securing means secures the hub in a wrapping position that is laterally removed from its final position in a plane generally parallel to the plane of the rim.

9. Apparatus for producing a fiber reinforced armature having a rim, hub, and an interconnecting spoke, with the hub being above the plane of the rim and the spoke extending concave downwardly therefrom to the rim, comprising: a mold having a rim forming recess; a hub supporting pedestal generally centrally located with respect to the rim, and a spoke shaping ramp which extends from said rim forming recess concave upwardly to said hub supporting pedestal; a hub having a fiber receiving recess positioned on said hub supporting pedestal, said hub being shaped so that said ramp is tangent to said fiber receiving recess on said hub; movable hub securing means for securing said hub in a wrapping position spaced apart from said ramp and again in a final position adjacent said ramp, said positions being spaced apart by a distance such that fibers extending from said hub recess to said rim will be up off of said ramp when wrapped and will be sagged to adjacent said ramp when the hub is moved to its final position adjacent said ramp.

10. The apparatus of claim 9 including: means for pressing the spoke fibers down onto said ramps, and wherein said final position of said hub securing means holds the sagged fibers from completely engaging said ramps, and said last mentioned means pushes the spoke forming fibers down onto the ramp to stretch the fibers tightly around the hub.

11. The apparatus of claim 10 wherein: said wrapping position of the hub is spaced laterally of the final position.

12. In a mold for producing armatures having a rim, a hub, and an interconnecting spoke: a base having a spoke forming cavity therein; a mold cover having at least one spoke confining surface adapted to compress a spoke in said spoke forming cavity when the cover is pressed down upon said base, said base forming a rim cavity which communicates with its radially outer periphery; a pair of opposite hand compression bands adapted to project into said rim cavity, said bands having a lip that projects into the rim forming cavity of the armature to be formed and each band having terminal ears at their ends for matching with the terminal ears of the other band; said cover having depending legs for confining the terminal ears of adjacent ends of bands when the bands are in position in said rim cavity; and means on said depending legs for securing said cover to said terminal ears of said bands; and whereby the bands and an armature made in the mold are removed from the base of the mold when the mold cover is separated from the base.

13. The mold of claim 12 wherein: the legs of the cover wedge the bands together as the cover is pushed down into the spoke forming cavity.

14. The mold of claim 13 wherein said legs have a locking taper with said ears of said bands.

15. The mold of claim 12 wherein said base has a separate rim cover segment for a portion of the rim cavity, said rim cover segment being held down upon the base by a headed tapered pin with the head of the pin being carried in either the base member or a rim cover segment member, and the tapered portion of the pin being received in a locking taper in the other one of the members; and spring means beneath the head of said pin for urging the pin out of the locking taper.

16. In a mold for producing armatures having a rim, a hub, and an interconnecting spoke; a base having a spoke forming cavity therein; a removable rim cover segment overlying said base, said base and rim cover segment forming a rim cavity which communicates with their radially outer periphery; a pair of opposite hand compression bands adapted to project into said rim cavity, each band having terminal ears at their ends for matching with the terminal ears of the other band; a mold cover having a spoke confining surface adapted to compress a spoke in said spoke cavity when the cover is pressed down upon said base, said cover having depending legs for confining the terminal ears of adjacent ends of bands when in position in said rim cavity; and means on said depending legs for securing said cover to said terminal ears of said bands; and whereby the bands, rim cover segment and armature made in the mold are removed from the base of the mold when the mold cover is separated from the base.

17. The mold of claim 16 wherein said rim cover segment is held down upon the base by a headed tapered pin with the head of the pin being carried in either the base member or a rim cover segment member, and the tapered portion of the pin being received in a locking taper in the other one of the members; and spring means beneath the head of said pin for urging the pin out of the locking taper.

18. The mold of claim 16 wherein: said legs of said mold cover have a wedging abutment with said terminal ears to lock said bands together when said cover moves into said spoke forming cavity.

* * * * *